UNITED STATES PATENT OFFICE.

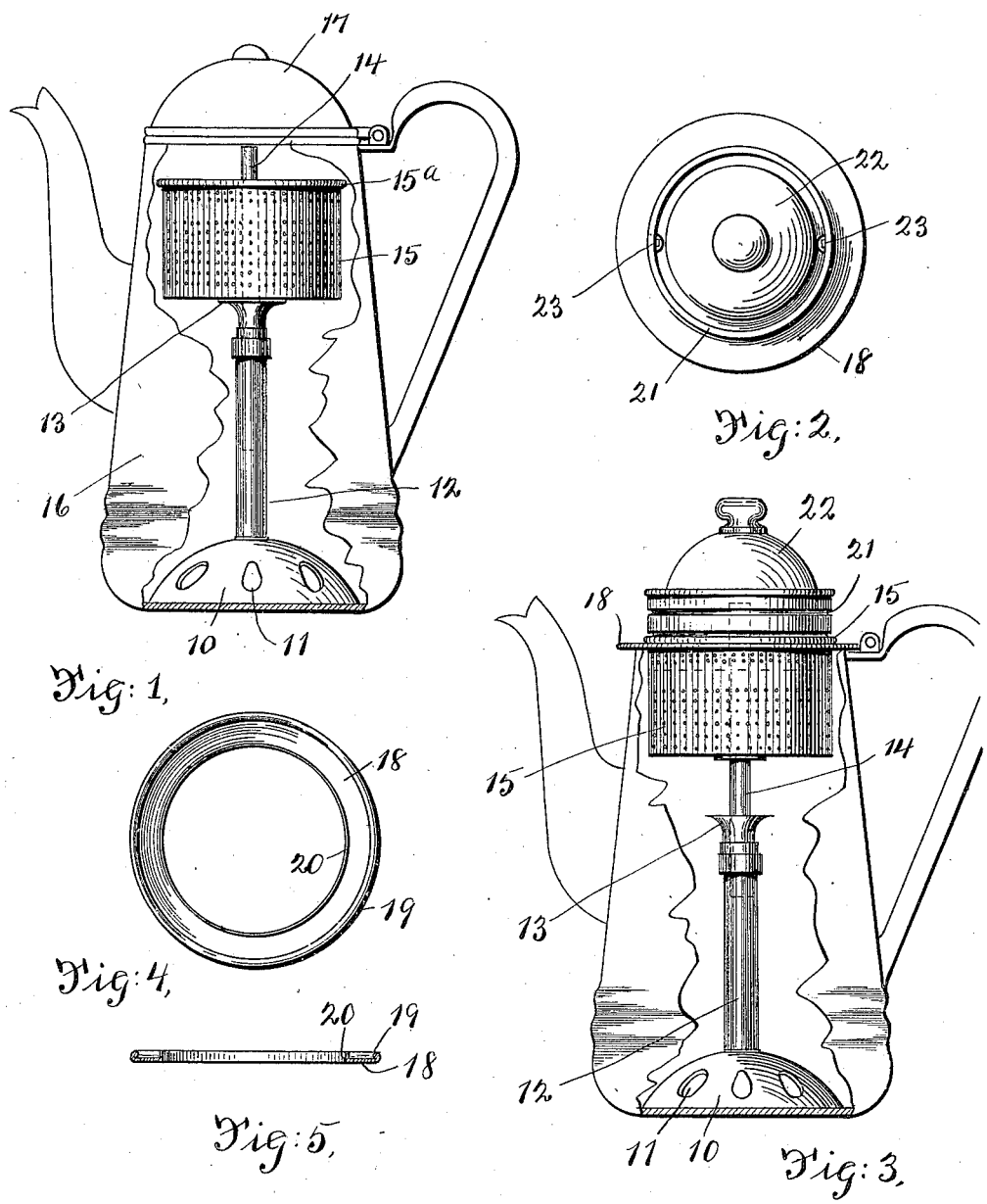

WILLIAM S. JESSUP, OF NEW YORK, N. Y.

COFFEE-PERCOLATOR.

1,092,575.   Specification of Letters Patent.   Patented Apr. 7, 1914.

Application filed August 29, 1913. Serial No. 787,257.

*To all whom it may concern:*

Be it known that I, WILLIAM S. JESSUP, of the city, county, and State of New York, have invented a new and useful Improvement in Coffee-Percolators, of which the following is a full, clear, and exact description.

My invention relates to improvements in coffee percolators, and the object of my invention is to produce a very simple and efficient coffee percolator which can be made cheap, and which in its simplest form can be used in the ordinary coffee pot without altering the construction of the pot, and in a manner to permit the usual coffee pot cover to be placed in the customary manner.

My invention is intended also to produce a percolator which when used in the simple form above referred to can be easily applied to pots of various sizes without adjusting any of the parts, and which will afford means of making coffee of good quality quickly.

My invention is also intended to obviate the use of fabric bags, which are difficult to keep sanitary and which injure the taste and color of the coffee, and further to provide an attachment which can be applied to the ordinary coffee pot, and which will greatly increase the capacity of the percolator.

In general, my invention is intended to produce a simple, cheap and efficient means of making first quality percolated coffee.

Reference is to be had to the accompanying drawings, forming a part of this specification, in which similar letters and figures refer to similar parts through the several views.

Figure 1 is a broken side elevation of a coffee pot provided with my improved percolator. Fig. 2 is a plan view of the attachment forming a part of the percolator. Fig. 3 is a side elevation of the percolator and extension attachment as applied to a coffee pot, the latter being broken away to disclose the percolator. Fig. 4 is an inverted plan view of a ring, forming a part of the attachment; and Fig. 5 is a cross section of the ring shown in Fig. 4.

The percolator is provided with a hollow base 10 flat at the bottom, which is provided with numerous perforations 11 through which the boiling water may pass, and rising from the base is a tube 12 which terminates at the top in a bell mouth 13. The tube 12 is adapted to receive an extension tube 14 which carries a perforated basket 15, which is made of metal and preferably aluminum. The tube 14 rises above the top of the basket 15 and has a rim 15$^a$ around its upper edge to provide an abutment for the ring 18 hereinafter referred to.

The above description applies to the percolator in its simplest form, and this can be used in an ordinary coffee pot 16 as shown in Fig. 1. The base 10 and tube 12 are placed in the pot, then the tube 14 and basket 15 are dropped to place, and it will be noticed that the bell mouth 13 will guide the tube 14 to place, so that the basket 15 drops upon the top 13, and it will be observed that no adjusting screws are necessary, and that when the basket 15 is simply inserted in the pot, the tube 14 will naturally be guided through the bell mouth 13 so as to properly meet the basket. When thus used the coffee is placed in the basket 15, the necessary amount of water placed in the pot and boiled for the necessary time. The boiling water will pass through the holes 11, tubes 12 and 14, and drop back through the basket 15, so that the coffee is strained and its full strength can be obtained.

Where it is necessary to make larger quantities of coffee, I use in connection with the above described percolator the attachments shown in Fig. 2. In this case the flat horizontally extending ring 18 is used, through which the basket 15 slides, and the flange 15$^a$ on the basket will prevent it from dropping through the ring. The ring is allowed to rest on the top of a coffee pot in which the percolator is placed. The ring is wide enough so that it will fit pots of various sizes and afford a closure which prevents the steam from passing out, and to prevent displacement the ring is provided with flanges 19 and 20 on its outer and inner edges. The basket 15 is thus supported on the ring 18 and a tubular extension 21 is used which slides into the basket and projects above the top thereof as shown in Fig. 3, this extension being provided with a cover 22, which is preferably of glass, and which locks to the extension 21 by means of a common bayonet joint, as shown at 23 in Fig. 2. I have not shown this joint in special detail because it is a common means of fastening a cover and other means can be used if preferred.

It will be noticed that when used as in Fig. 1 the percolator is contained entirely within the pot, and the ordinary cover 17 can be used in the customary way. But when the form shown in Fig. 3, which is adapted for larger quantities, is used, the cover 17 is dispensed with, and the ring 18 and cover 22 take the place of the usual cover.

From the foregoing description it will be seen that I provide a very simple device in which the parts are not held together by screws or similar fastenings, in which no adjustment is necessary, and which provides a simple means of making percolated coffee.

I claim:

1. A coffee percolator comprising a base, a perforated basket, a tubular connection between the basket and base whereby water can flow upward through the tube and into the basket, a supporting ring into which the basket slides, said ring adapted to rest on the top of the pot, a removable extension top projecting from the basket above the ring and a cover for the top.

2. The combination with the basket and the tube extending vertically through the basket and downward into a coffee pot, of a ring supporting the basket and into which the basket slides, said ring being adapted to rest on the top of the pot, said ring having an outer flange on the under side, a removable extension top projecting from the basket above the ring, and a cover for the pot.

3. A coffee percolator comprising a base, a tube rising from the base, means for admitting water through the base and into the tube bottom, a perforated metallic basket, a tube extending through the bottom of the basket and adapted to connect with the first mentioned tube, a flat horizontally extending ring supporting the basket and into which the basket slides, said ring being adapted to rest on the top of the pot, and a removable extension top sliding into and projecting from the basket top, said extension top having a suitable cover.

WILLIAM S. JESSUP.

Witnesses:
WARREN B. HUTCHINSON,
ARTHUR G. DANNELL.